United States Patent
Lin et al.

(10) Patent No.: US 8,376,850 B2
(45) Date of Patent: Feb. 19, 2013

(54) GAME CONTROLLER AND CONTROLLING METHOD THEREOF

(75) Inventors: Chen-Ter Lin, Taipei Hsien (TW); Yen-Hao Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 12/543,515

(22) Filed: Aug. 19, 2009

(65) Prior Publication Data

US 2010/0304866 A1 Dec. 2, 2010

(30) Foreign Application Priority Data

May 31, 2009 (CN) .......................... 2009 1 0302791

(51) Int. Cl.
*A63F 9/24* (2006.01)

(52) U.S. Cl. .......................................... 463/36; 463/49

(58) Field of Classification Search ................ 463/1–4, 463/7, 36, 37, 47, 49; 273/148 R, 148 B, 273/440, 454

See application file for complete search history.

(56) References Cited

U.S. PATENT DOCUMENTS

| | | | | | |
|---|---|---|---|---|---|
| 5,251,903 | A | * | 10/1993 | Bixler et al. | 473/458 |
| 5,446,286 | A | * | 8/1995 | Bhargava | 250/361 R |
| 6,157,898 | A | * | 12/2000 | Marinelli | 702/141 |
| 2007/0059675 | A1 | * | 3/2007 | Kuenzler et al. | 434/251 |
| 2007/0167266 | A1 | * | 7/2007 | DeVall | 473/505 |
| 2008/0165255 | A1 | * | 7/2008 | Christie et al. | 348/207.99 |
| 2008/0318681 | A1 | * | 12/2008 | Rofougaran et al. | 463/39 |
| 2009/0029754 | A1 | * | 1/2009 | Slocum et al. | 463/5 |
| 2010/0184564 | A1 | * | 7/2010 | Molyneux et al. | 482/1 |

FOREIGN PATENT DOCUMENTS

| | | |
|---|---|---|
| TW | M315081 U | 7/2007 |
| TW | M346436 U | 12/2008 |
| TW | M354743 U | 4/2009 |

OTHER PUBLICATIONS

"Nintendo to replace Wii wrist straps," Dec. 15, 2006, Pittsburgh Business Times.*
Brandon Taylor & V. Michael Bove, Jr., "Graspables: Grasp-Recognition as a User Interface," Apr. 7, 2009, CHI 2009 ~ Techniques for Mobile Interaction.*

* cited by examiner

*Primary Examiner* — David L Lewis
*Assistant Examiner* — Robert Mosser
(74) *Attorney, Agent, or Firm* — Altis Law Group, Inc.

(57) ABSTRACT

A game controller includes a housing, a number of press sensors and touch sensors, and a main circuit embedded in the housing powered by a battery. The main circuit includes a collecting module, a comparing module and a controlling module. The press sensors detects pressure from the housing and outputting a number of pressure signals. The touch sensors detects a plurality of touch signals. The collecting module collects and combines the pressure signals and the touch signals into a first positioning signal and a second positioning signal correspondingly. The comparing module predetermines a number of preset signal values and a number of preset pitches correspondingly and compares the first and second positioning signals with the preset signal values. The controlling module triggers one of the preset pitches when the first positioning signal and the second positioning signal are equal to the preset signal values.

20 Claims, 4 Drawing Sheets

GAME CONTROLLER AND CONTROLLING METHOD THEREOF

BACKGROUND

1. Technical Field

The present disclosure relates to controllers and, particularly, to a game controller and a controlling method thereof.

2. Description of Related Art

During a baseball game, how the baseball is gripped is one of the most important factors impacting the pitch. Generally, different baseball grips result in different pitches.

However, when playing a baseball video game, the pitches are controlled via a game controller with direction keys. For example, a conventional game controller for the baseball video game includes a cross-shaped directional key for controlling the pitches, thus it will deaden the third dimension of playing.

Therefore, it is desirable to provide a game controller and a controlling method thereof, which can overcome or at least alleviate the above-mentioned problems.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
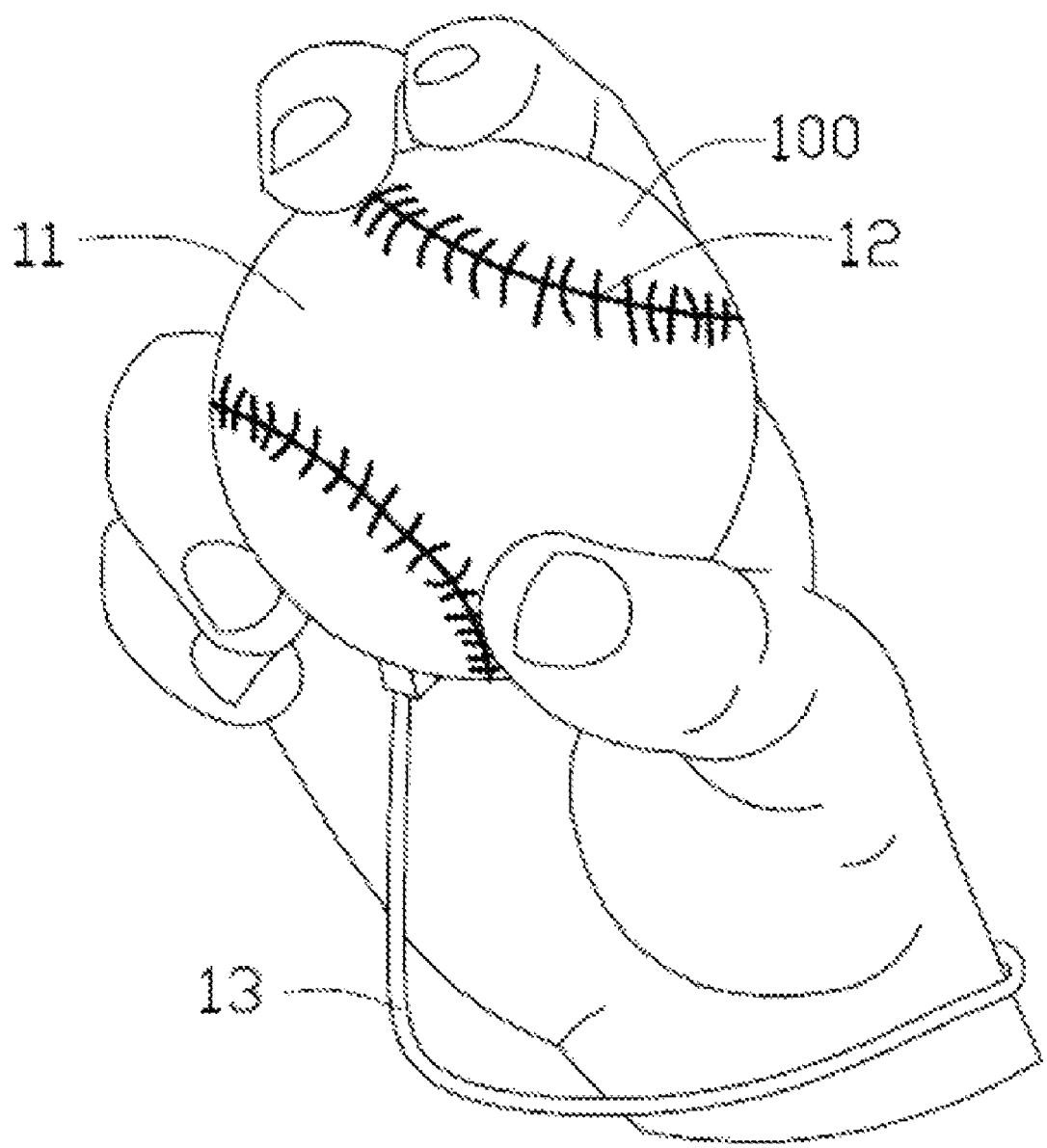
FIG. 1 is a schematic, isometric view of a game controller, according to an exemplary embodiment.
Figure 2:
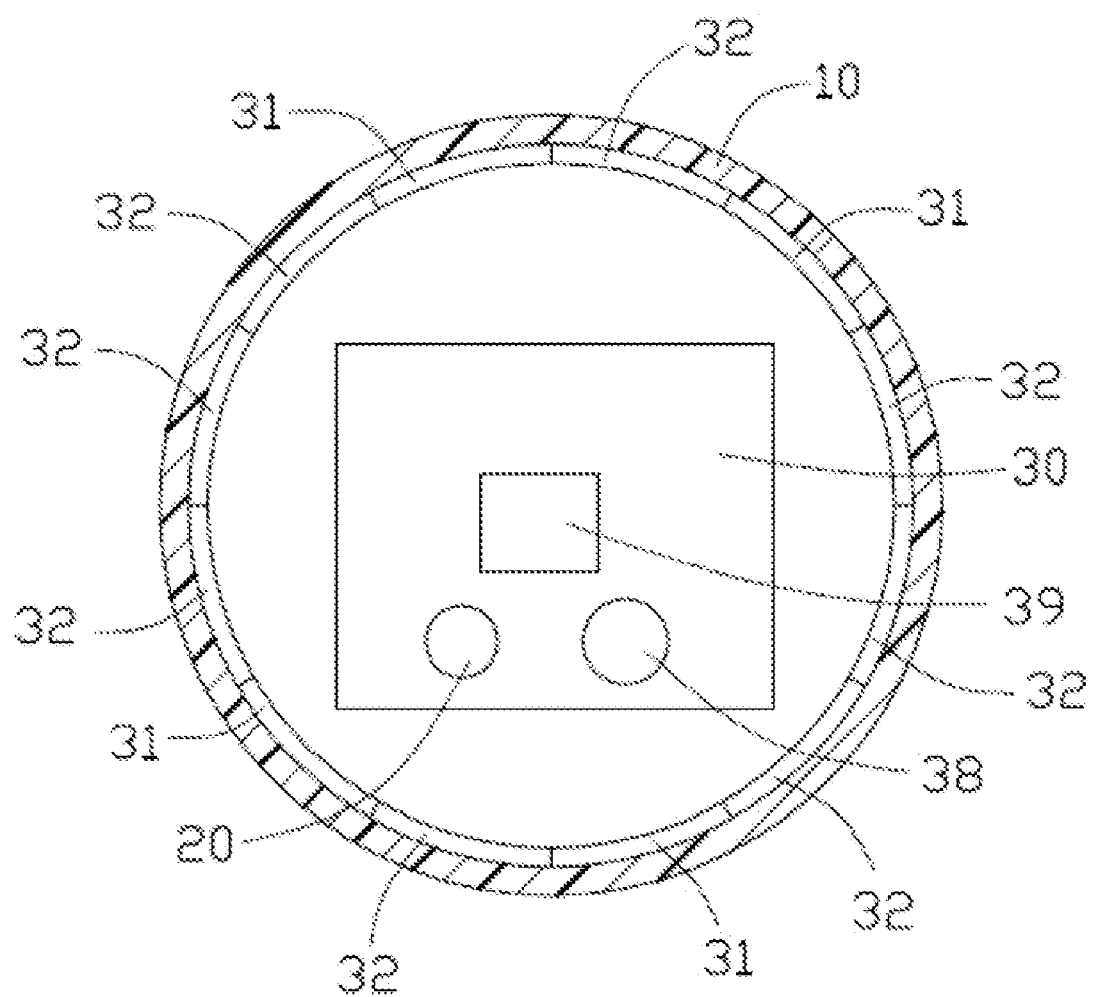
FIG. 2 is a cross-sectional view of the game controller of FIG. 1.

Referring to FIGS. 1 and 2, a game controller 100 for controlling a pitch direction of a baseball game is shown. In this embodiment, the game controller 100 is a remote controller and communicates with a game console (not shown) via infrared ray. A current pitch of the baseball can be shown on a display (not shown) connected to the game console. The game controller 100 includes a housing 10, a battery 20, and a main circuit 30 embedded in the housing 10.

The housing 10 is a baseball-shaped configuration. The housing 10 includes a first region 11 and a second region 12 connected to the first region 11. In this embodiment, the first region 11 is made of leather material, while the second region 12 is a seam and made of elastic material. The housing 10 further includes a strap 13 fixed to the first region 11 and hung on a user's wrist.

The battery 20 is electrically connected to the main circuit 30 and configured for providing electrical power to the main circuit 30. In this embodiment, the battery 20 is a lithium cell.

Figure 3:
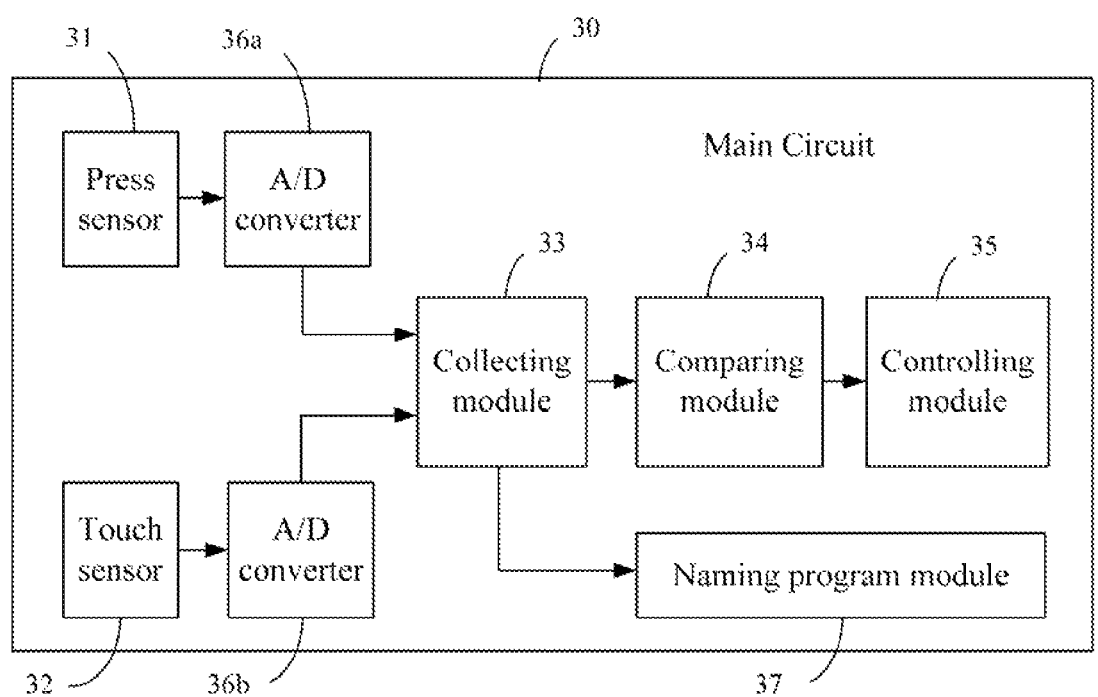
FIG. 3 is a functional block diagram of the game controller of FIG. 1.

Referring to FIG. 3, the game controller 100 further includes a number of press sensors 31 and a number of touch sensors 32 connected to the main circuit 30. The main circuit 30 includes a collecting module 33, a comparing module 34, and a controlling module 35. In this embodiment, the collecting module 33, the comparing module 34, the controlling module 35 are integrated in the main circuit 30, and the press sensors 31 and the touch sensors 32 are received in the housing 10.

The press sensors 31 are disposed under the second region 12 independently and assigned with a unique first identifier, correspondingly. In this embodiment, the press sensors 31 are assigned first identifiers numerically according to the position of the press sensors 31 relative to the strap 13 and the first identifiers are stored in a memory (not shown).

A first analog-to-digital converter 36a (A/D converter) is connected between the press sensors 31 and the collecting module 33. The press sensors 31 are configured for transmitting a number of pressure signals to the first A/D converter 36a according to the order of the first identifiers when the press sensors 31 are pressed correspondingly. The first A/D converter 36a is configured for converting each of the pressure signals into a digital signal and transmitting the digital signal to the collecting module 33 one by one. In this embodiment, the first A/D converter 36a outputs a signal "1" when one of the press sensor 31 senses the pressure, otherwise outputs a signal "0" when the press sensor 31 does not sense any pressure.

The touch sensors 32 are embedded under the first region 11. Each touch sensor 32 is assigned a second identifier numerically according to the position of the touch sensors 32 relative to the strap 13. A second A/D converter 36b is connected between the touch sensor 32 and the collecting module 33. Each touch sensor 32 is configured for transmitting a touched signal to the second A/D converter 36b according to the order of the second identifier. The second A/D converter 36b is configured for converting the touch signals into a digital signal and transmitting the digital signal to the collecting module 33. In this embodiment, the touch sensors 32 are capacitance type sensors. When the touch sensor 32 is touched, the capacitance changes and the second A/D converter 36b outputs the digital signal according to the changed capacitance. In this embodiment, the second A/D converter 36b outputs a signal "1" when the capacitance of the touch sensor 32 changes, otherwise outputs a signal "0" when the capacitance of the touch sensor 32 does not change.

The collecting module 33 is configured for collecting the digital signals from the first and second A/D converters 36a and 36b, respectively, and combining the digital signals from the first A/D converter 36a into a first positioning signal and the digital signals from the second A/D converter 36b into a second positioning signal. In this embodiment, the first positioning signal and the second positioning signal are composed of a number of signals "1" and signals "0", respectively, and the order of the signals "1" and signals "0" arranged is the same as the order of the first identifiers and the second identifiers correspondingly.

The comparing module 34 predetermines a number of preset signal values and a number of preset pitches corresponding to the preset signal values. The comparing module 34 is configured for comparing the first positioning signal and the second positioning signal with the preset signal values one by one.

The controlling module 35 is configured for controlling the game console to select one of the preset pitches as a current pitch according to the preset signal values, and display the current pitch on the display. In this embodiment, the controlling module 35 is connected to the game console that can display the pitch on the display. When a combination of the first positioning signal and the second positioning signal does not equal to the preset signal values, the controlling module 35 controls the comparing module 34 to continue comparing the first positioning signal and the second positioning signal with the rest of the preset signal values.

In order to be more realistic, the main circuit 30 further includes a naming program module 37 for renaming the current pitch according to user input. The naming program module 37 is connected to the collecting module 33. When the collecting module 33 collects one of the first positioning signal and one of the second positioning signal, the game console shows a command for editing the name of a current pitch or not. The naming program module 37 can store the new name of the current pitch when the original name is edited.

Referring back to FIG. 2, in order to motivate the feeling of third dimension, the game controller 100 further includes an acceleration transducer 38 embedded in the housing 10 and a gyroscope 39 disposed in the center of the housing 10. The acceleration transducer 38 calculates an acceleration of the game controller 100 according to a composition of forces applied on the housing 10 and driving the baseball in the game with such acceleration. The gyroscope 39 senses a rotary speed of the game controller 100 and representing the rotary movement of the baseball with such rotary speed.

When in use, the game controller 100 is held in one's hand as shown in FIG. 1 such that the first region 11 rest in the palm, and the second region is pressed by the fingers, then the game controller 100 is thrown out. At this time, the press sensor 31 outputs the pressure signals according to where the fingers locate and the touch sensors 32 outputs the touch signals according to where the user's palm held. Because, the strap 13 is hung on the wrist to limit how far the game controller can be thrown (pitch), thereby preventing damages the game controller 100. The collecting module 33 collects the pressure signals and the touch signals and achieves a first positioning signal and a second positioning signal, then, the comparing module 34 can confirm a preset pitch as a current pitch when both the first positioning signal and the second positioning signal are equal to the preset signal values. The controlling module 35 controls the game console to trigger one of the preset pitches to be started as a current pitch when both of the first positioning signal and the second positioning signal are equal to the preset signal values, and then the current pitch displayed on the display according to the preset pitch with the acceleration and the rotary speed of the game controller 100.

Figure 4:
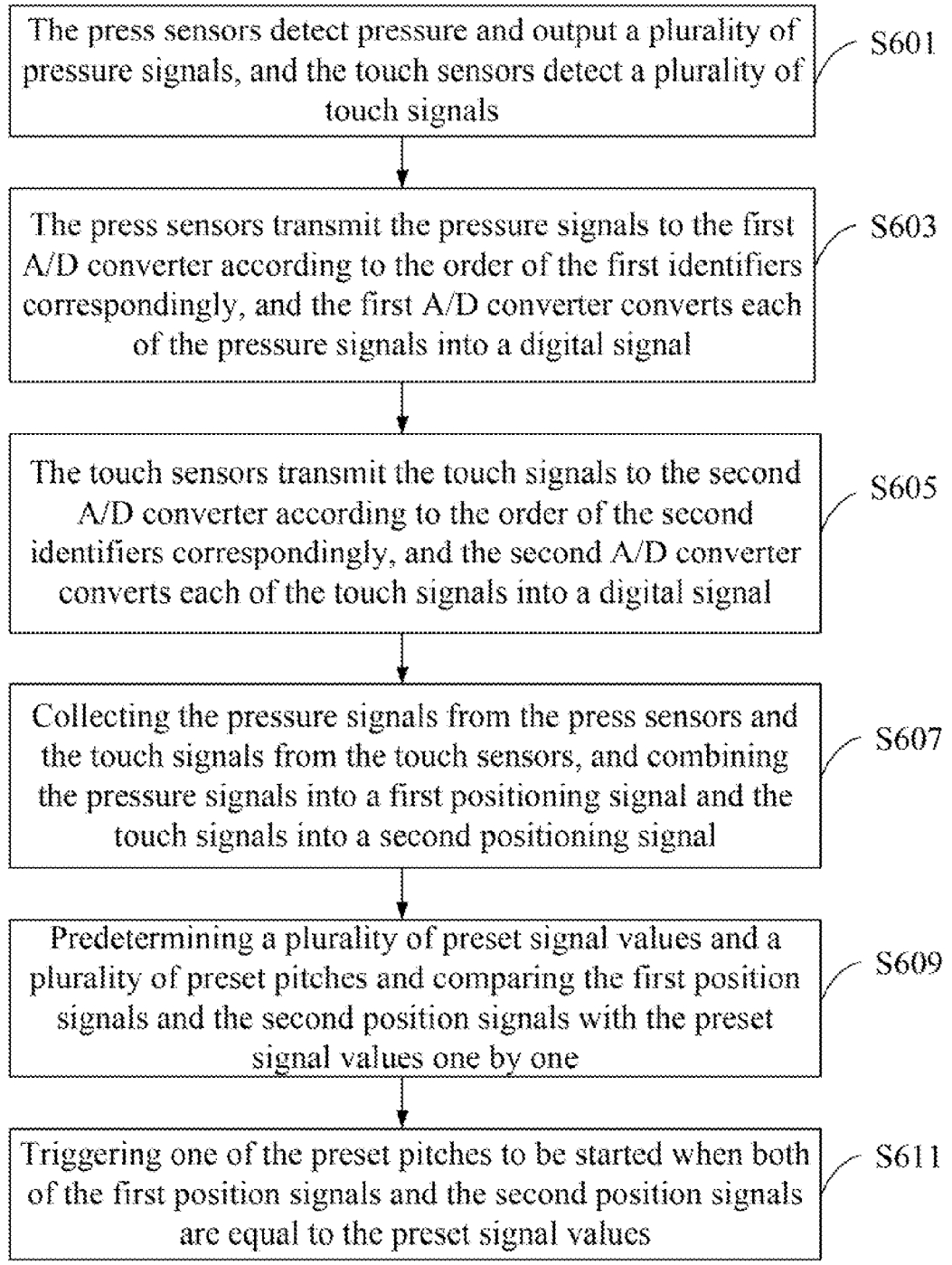
FIG. 4 is a flowchart of a controlling method of the game controller of FIG. 1, according to an exemplary embodiment.

Referring to FIG. 4, a controlling method for the game controller 100 with a number of press sensors 31 and a number of touch sensors 32 includes the following steps.

In step S601, the press sensors 31 detect pressure and outputs a plurality of pressure signals, and the touch sensors 32 detect a plurality of touch signals. The press sensors 31 are assigned with a plurality of first identifiers, the touch sensors 32 are assigned with a plurality of second identifiers, respectively. The first A/D converter is connected to the press sensors 31, and the method further comprises step S603: the press sensors 31 transmit the pressure signals to the first A/D converter 36a according to the order of the first identifiers correspondingly, and the first A/D converter 36a converts each of the pressure signals into a digital signal. The second A/D converter 36b is connected to the touch sensor, and the method further comprises step S605: the touch sensors 32 transmit the touch signals to the second A/D converter 36b according to the order of the second identifiers correspondingly, and the second A/D converter 36b converts each of the touch signals into a digital signal.

In step S607, the pressure signals from the press sensors 31 and the touch signals from the touch sensors 32 are collected correspondingly. And the pressure signals are combined into a first positioning signal and the touch signals are combined into a second positioning signal.

In step S609, the number of preset signal values and the number of preset pitches corresponding to the preset signal values are predetermined. Then the first positioning signal and the second positioning signal are compared with the preset signal values one by one.

In step S611, when each of the first positioning signal and the second positioning signal are equal to the preset signal values, one of the preset pitches is triggered to be started. Meanwhile, the preset pitch is controlled to be displayed on the display as a current pitch when the preset pitch is started. When one of the first positioning signal and the second positioning signal is not equal to the preset signal values, the first positioning signal and the second positioning signal are continued to be compare with the preset signal values.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A game controller for controlling a game console, comprising:
   a housing comprising a first region and a second region;
   a main circuit embedded in the housing and powered by a battery; and
   a plurality of press sensors spreading under the second region and configured for detecting pressure from the second region and outputting a plurality of pressure signals;
   a plurality of touch sensors embedded under the first region and configured for detecting a plurality of touch signals from the first region;
   a collecting module configured for collecting the pressure signals and the touch signals from the press sensors and the touch sensors correspondingly, and combining the pressure signals into a first positioning signal and the touch signals into a second positioning signal;
   a comparing module predetermining a plurality of preset signal values and a plurality of preset pitches corresponding to the preset signal values and configured for comparing the first positioning signal and the second positioning signal with the preset signal values one by one; and
   a controlling module configured for controlling the game console to trigger one of the preset pitches to be started when each of the first positioning signal and the second positioning signal are equal to the preset signal values.

2. The game controller in claim 1, wherein the first region is made of leather material, while the second region is a seam and made of elastic material.

3. The game controller in claim 1, wherein the housing comprises a strap fixed to the first region and configured for being hung on a user's wrist for limiting the thrown pitch distance of the game controller.

4. The game controller in claim 3, wherein the press sensors are assigned with a plurality of first identifiers, the touch sensors are assigned with a plurality of second identifiers, respectively.

5. The game controller in claim 4, wherein a first analog-to-digital converter (A/D converter) is connected between the press sensors and the collecting module, the press sensors are configured for transmitting the pressure signals to the first A/D converter according to the order of the first identifiers correspondingly, and the first A/D converter is configured for converting each of the pressure signals into a digital signal and transmitting the digital signals to the collecting module one by one.

6. The game controller in claim 4, wherein a second analog-to-digital converter (A/D converter) is connected between the touch sensor and the collecting module, the touch sensors are configured for transmitting the touch signals to the second A/D converter according to the order of the second identifiers correspondingly, and the second A/D converter is configured for converting each of the touch signals into a digital signal and transmitting the digital signals to the collecting module.

7. The game controller in claim 5, wherein the first A/D converter outputs a signal "1" when one of the press sensor senses the pressure, otherwise outputs a signal "0" when the press sensor does not sense any pressure, and the first positioning signal is composed of a number of signals "1" and signals "0".

8. The game controller in claim 6, wherein the touch sensors are capacitance type sensors.

9. The game controller in claim 8, wherein the second A/D converter outputs a signal "1" when the capacitance of the touch sensor changes, otherwise outputs a signal "0" when the capacitance of the touch sensor does not change, and the second positioning signal is composed of a number of signals "1" and signals "0".

10. The game controller in claim 1, wherein when one of the first positioning signal and the second positioning signal is not equal to the preset signal values, the comparing module continues to compare the first positioning signal and the second positioning signal with the rest of the preset signal values.

11. The game controller in claim 1, wherein the main circuit further comprises a naming program module for renaming the preset pitch according to user input.

12. The game controller in claim 1, further comprising an acceleration transducer embedded in the housing and a gyroscope disposed in the center of the housing.

13. The game controller in claim 12, wherein the acceleration transducer calculates an acceleration of the game controller according to a composition of forces applied on the housing and driving the baseball in the game with such acceleration.

14. The game controller in claim 12, wherein the gyroscope senses a rotary speed of the game controller.

15. The game controller in claim 1, being baseball-shaped.

16. A controlling method for a game controller with a number of press sensors and a number of touch sensors comprising the following steps:
    detecting pressure via the press sensors and outputting a plurality of pressure signals, and
    detecting a plurality of touch signals via the touch sensors;
    collecting the pressure signals from the press sensors and the touch signals from the touch sensors correspondingly, and combining the pressure signals into a first positioning signal and the touch signals into a second positioning signal;
    predetermining a plurality of preset signal values and a plurality of preset pitches corresponding to the preset signal values and comparing the first positioning signal and the second positioning signal with the preset signal values one by one;
    triggering one of the preset pitches to be started when each of the first positioning signal and the second positioning signal are equal to the preset signal values.

17. The controlling method in claim 16, wherein the press sensors are assigned with a plurality of first identifiers, the touch sensors are assigned with a plurality of second identifiers, respectively.

18. The controlling method in claim 17, wherein a first analog-to-digital converter (A/D converter) is connected to the press sensors, and the method further comprises: the press sensors transmitting the pressure signals to the first A/D converter according to the order of the first identifiers correspondingly, and the first A/D converter converting each of the pressure signals into a digital signal.

19. The controlling method in claim 17, wherein a second A/D converter is connected to the touch sensor, and the method further comprises: the touch sensors transmitting the touch signals to the second A/D converter according to the order of the second identifiers correspondingly, and the second A/D converter converting each of the touch signals into a digital signal.

20. The controlling method in claim 16, wherein when one of the first positioning signal and the second positioning signal is not equal to the preset signal values, the method further comprises: continuing to compare the first positioning signal and the second positioning signal with the rest of the preset signal values.

* * * * *